United States Patent [19]

Takenaka et al.

[11] Patent Number: 5,357,433
[45] Date of Patent: Oct. 18, 1994

[54] GAIT GENERATION SYSTEM FOR A LEGGED MOBILE ROBOT

[75] Inventors: Toru Takenaka; Tadaaki Hasegawa, both of Saitama, Japan

[73] Assignee: Honda Giken Kogyo Kabushiki Kaisha, Tokyo, Japan

[21] Appl. No.: 65,213

[22] Filed: May 20, 1993

[30] Foreign Application Priority Data

May 22, 1992 [JP] Japan .................................. 4-155916

[51] Int. Cl.⁵ ...................... B62D 57/02; G05B 19/00
[52] U.S. Cl. .................................. 364/424.02; 901/1; 901/2; 318/568.12; 318/568.15; 180/8.6; 180/8.1
[58] Field of Search ................... 304/424.02; 901/1, 2; 318/568.12, 568.15, 568.17, 568.2; 395/86; 180/8.6, 8.1

[56] References Cited

U.S. PATENT DOCUMENTS

| | | | |
|---|---|---|---|
| 4,834,200 | 5/1989 | Kajita | 180/8.1 |
| 5,151,859 | 9/1992 | Yoshino et al. | 364/424.02 |
| 5,159,988 | 11/1992 | Gomi et al. | 180/8.6 |
| 5,206,569 | 4/1993 | Ozawa | 318/568.12 |
| 5,221,883 | 6/1993 | Takenaka et al. | 318/568.12 |
| 5,252,901 | 10/1993 | Ozawa et al. | 318/568.12 |
| 5,255,753 | 10/1993 | Nishikawa et al. | 180/8.6 |

FOREIGN PATENT DOCUMENTS 62-97005  5/1987  Japan .
63-15017  6/1988  Japan .

OTHER PUBLICATIONS

Robotics Handbook (Oct. 1990) Robotic Society of Japan.

Primary Examiner—Thomas G. Black
Assistant Examiner—Julie D. Day
Attorney, Agent, or Firm—Lyon & Lyon

[57] ABSTRACT

A gait generation for a biped mobile robot having a body and two legs each connected to the body and having a foot at its distal end in walking a terrain including a first surface and a second surface met at a dihedral angle such that the robot feet are in simultaneous contact with the different two surfaces, The centers of ground contact pressure distribution of the first and second surfaces are determined. A virtual third surface which assumes to vary from the first surface to the second surface is established. Then a virtual ZMP (Zero Moment Point) is assumed on the virtual third surface such that the virtual ZMP is displaced along a path obtained by connecting the centers of the ground pressure distribution of the first and second surfaces. And a gait for the robot is generated such that a ZMP kinematically determined from the motion of the robot coincides with the target ZMP.

14 Claims, 10 Drawing Sheets

FIG.3

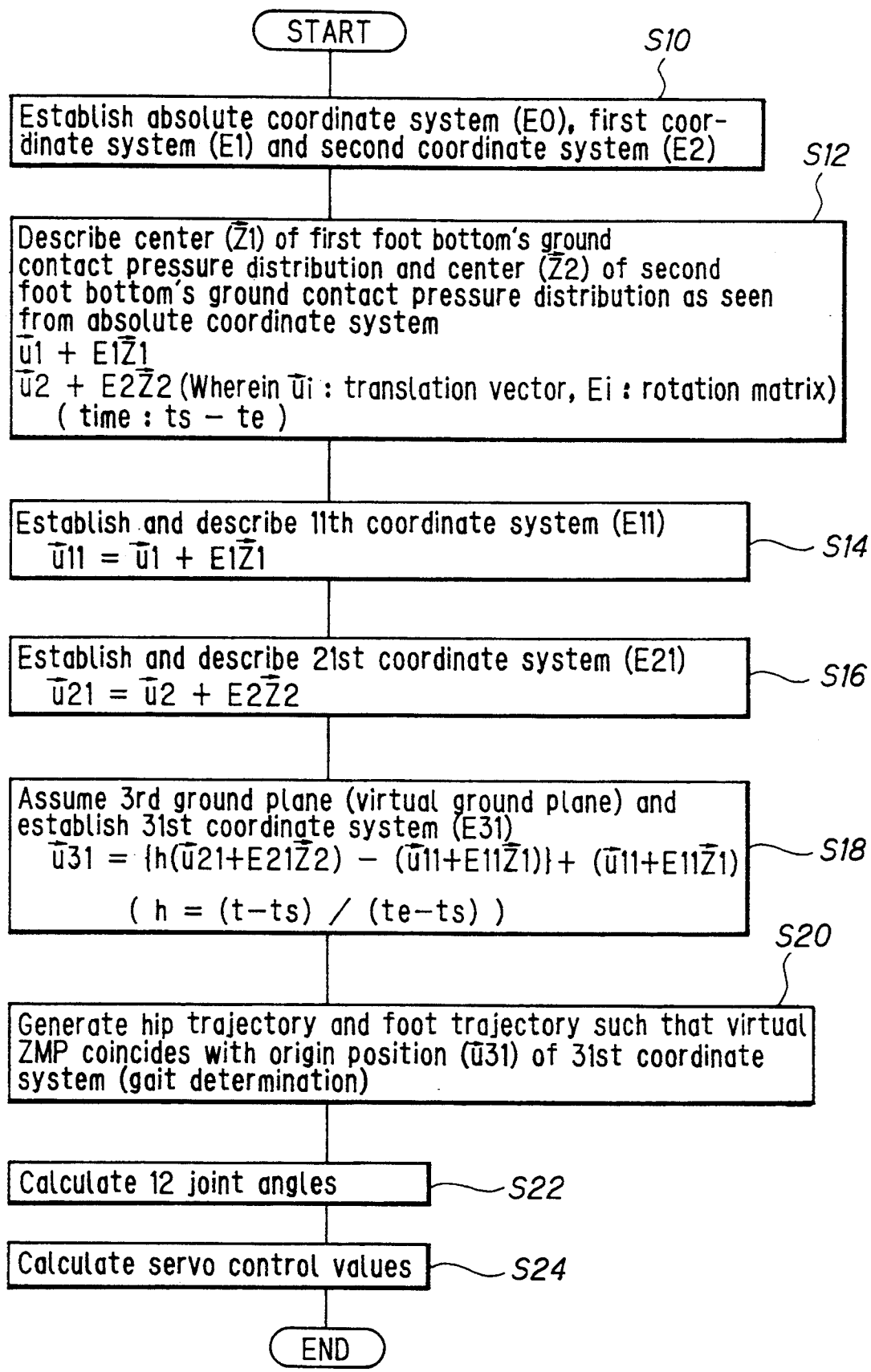

START

S10: Establish absolute coordinate system (E0), first coordinate system (E1) and second coordinate system (E2)

S12: Describe center ($\bar{Z}_1$) of first foot bottom's ground contact pressure distribution and center ($\bar{Z}_2$) of second foot bottom's ground contact pressure distribution as seen from absolute coordinate system
$\bar{u}_1 + E_1\bar{Z}_1$
$\bar{u}_2 + E_2\bar{Z}_2$ (Wherein $\bar{u}_i$: translation vector, $E_i$: rotation matrix)
(time: $t_s - t_e$)

S14: Establish and describe 11th coordinate system (E11)
$\bar{u}_{11} = \bar{u}_1 + E_1\bar{Z}_1$

S16: Establish and describe 21st coordinate system (E21)
$\bar{u}_{21} = \bar{u}_2 + E_2\bar{Z}_2$

S18: Assume 3rd ground plane (virtual ground plane) and establish 31st coordinate system (E31)
$\bar{u}_{31} = \{h(\bar{u}_{21}+E_{21}\bar{Z}_2) - (\bar{u}_{11}+E_{11}\bar{Z}_1)\} + (\bar{u}_{11}+E_{11}\bar{Z}_1)$
($h = (t-t_s) / (t_e-t_s)$)

S20: Generate hip trajectory and foot trajectory such that virtual ZMP coincides with origin position ($\bar{u}_{31}$) of 31st coordinate system (gait determination)

S22: Calculate 12 joint angles

S24: Calculate servo control values

END

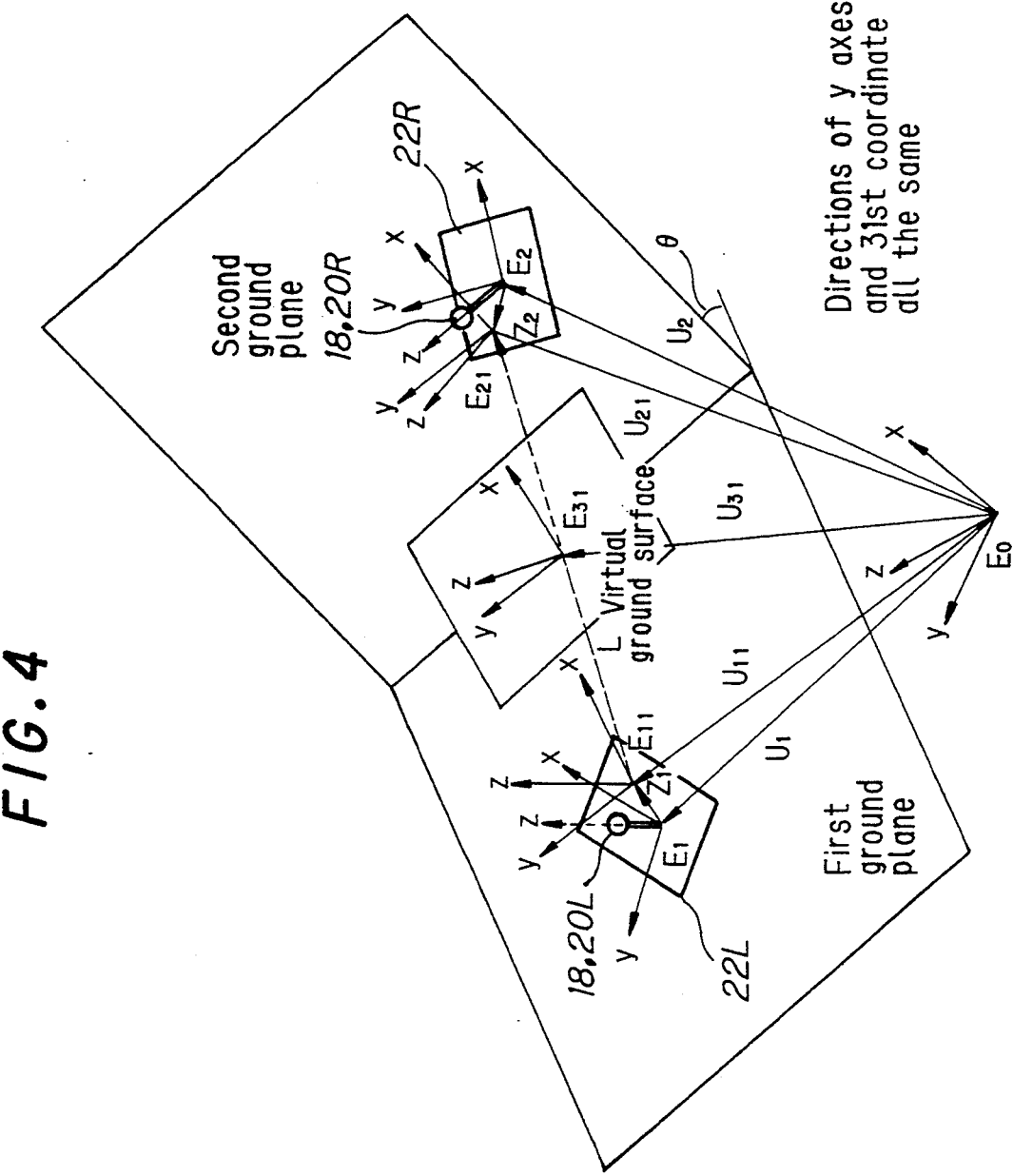

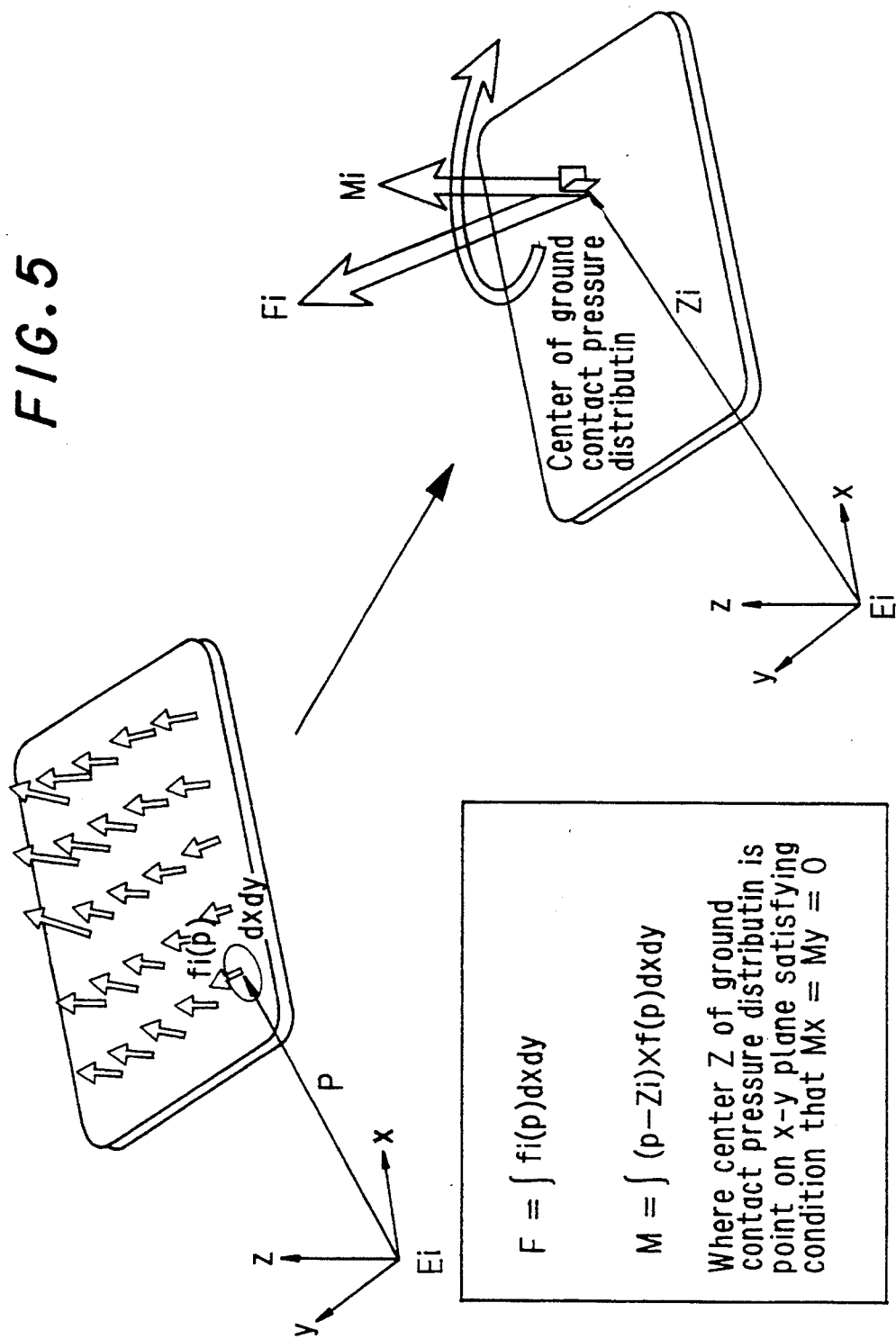

Line of intersection

Line of intersection

5,357,433

GAIT GENERATION SYSTEM FOR A LEGGED MOBILE ROBOT

BACKGROUND OF THE INVENTION

1. Field of the Invention

This invention relates to a system for generating a gait (walking pattern) for a legged mobile robot, more particularly to a system for generating a gait (walking pattern) for a legged mobile robot using biped locomotion, which enables the robot to satisfy the conditions for dynamic equilibrium and achieve stable walking even when walking on uneven terrain not constituted by a single plane.

2. Description of the Prior Art

Legged mobile robots, in particular legged mobile robots using biped locomotion, are taught by Japanese Laid-open Patent Publication Nos. 62 (1987)–97005 and 63(1988)–150176. An in-depth discussion of robot control, including the control of legged mobile robots, can be found in Robotics Handbook, Robotic Society of Japan, Oct. 20, 1990.

As explained in detail starting from page 347 of the Robotics Handbook, the concept of ZMP (zero moment point) has been introduced into the control of legged mobile robots, and the control is conducted by determining the gait (walking pattern) such that the ZMP follows a target trajectory. Here, the term ZMP means a point on the ground at which the horizontal moments around the x and y axes produced by the ground reaction force is zero irrespective of whether or not the vertical moment around the z axis arises. A required condition for dynamic force equilibrium in this case is that the ZMP be located inside a minimum convex polygon including the ground surface. Moreover, the margin of stability of the gait (walking pattern) can be optimized by designing it such that the ZMP is positioned as close as possible to the center of the minimum convex polygon including the ground surface.

The ZMP is, however, a concept that holds only with respect to a single plane, more specifically, a single horizontal plane. The ZMP concept cannot be applied to the design of a gait for a robot which is to walk across uneven terrain such as inclined terrain of varying gradient or the like because under such circumstances the robot will sometimes be in simultaneous contact with two or more ground planes that differ in height or the direction of their normals.

SUMMARY OF THE INVENTION

A first object of the invention is to provide a system for generating a gait (walking pattern) for a legged mobile robot which expands the ZMP concept to enable a gait generation for stable walking even on uneven terrain and in other situations where ground contact is made with two or more planes simultaneously.

On the other hand, in the control of a legged mobile robot, various advantages are obtained by maintaining the continuity of the resultant force and resultant moment of the inertial and gravitational forces acting on the robot, i.e. by maintaining the continuity of the resultant force and resultant moment of the ground reaction forces acting on the robot's legs. These advantages include, among others, that the resulting continuous acceleration of the robot's center of gravity ensures smooth robot movement and that the bottoms of the robot's feet tend to comply better with the terrain.

A second object of the invention is to provide a system for generating a gait (walking pattern) for a legged mobile robot which enables generation of a gait that in addition to enabling stable walking on uneven terrain also maintains the continuity of the resultant force and resultant moment of the ground reaction forces.

For realizing this object, the present invention provides a system for generating a gait of a legged mobile robot with a plurality of legs in walking on a terrain including at least a first Surface and a second surface such that the robot legs are in simultaneous contact with the first and second surfaces, comprising first means for assuming a virtual third surface which varies between the first and second surfaces, second means for assuming a target ZMP (Zero Moment Point) on the virtual third surface, and third means for generating a gait of the robot such that a ZMP kinematically determined from the motion of the robot coincides with the target ZMP.

BRIEF DESCRIPTION OF THE DRAWINGS

The above and other objects and advantages of the invention will be more apparent from the following description and drawings, in which:

FIG. 3 is a flow chart explaining a gait generation according to the invention;

FIG. 4 is a view explaining a terrain on which the robot is expected to walk and made of two surfaces (planes) meeting at a dihedral angle;

FIG. 5 is a view explaining ground contact pressure (distribution) generated when the robot's feet are rested on the different surfaces (planes) of FIG. 4 and the center of gravity of the ground contact pressure (distribution);

DETAILED DESCRIPTION OF THE PREFERRED EMBODIMENTS

Embodiments of the invention will now be explained based on a biped walking robot as an example.

Figure 1:
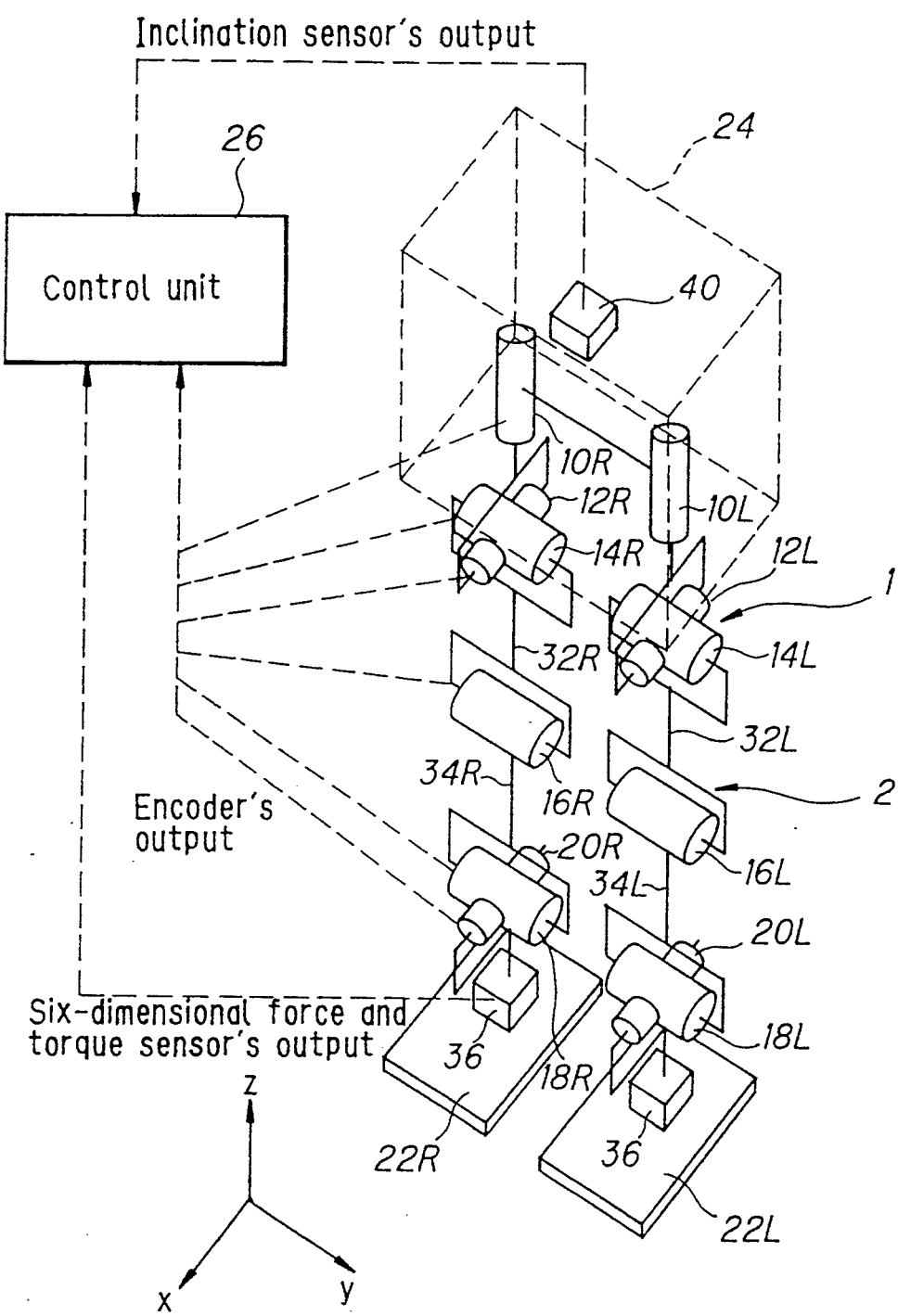
FIG. 1 is a schematic view showing the overall configuration of a gait generation system for a legged mobile robot according to the invention taking a biped mobile robot as an example.

An overall skeleton view of a biped walking robot 1 is shown in FIG. 1. The robot 1 has left and right legs 2 each having six joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Feet 22R, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links 34R, 34L.

The legs 2 thus have six degrees of freedom, so that during locomotion the legs as a whole can be caused to execute the desired motion by driving the 6=2=12 joints (axes) to appropriate angle. The robot is thus capable of walking freely within three dimensional space. The joints are provided mainly with electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the feet and also measuring the moment components Mx, My and Mz around the three axes, the six-dimensional force and torque sensor 36 detects whether or not the associated foot has landed and the magnitude and direction of the forces acting on the supporting leg. The sole of each foot is equipped at its four corners with touchdown switches 38, not illustrated in FIG. 1, of conventional design for detecting whether or not the foot is in contact with the ground. The top of the body 24 is provided with an inclination sensor 40 for detecting the robot's inclination angle and angular velocity relative to z axis in the x-z and y-z planes. Each electric motor at the individual joints is provided with a rotary encoder for generating rotational information. And, although not illustrated in FIG. 1, the robot 1 is provided with a zero reference switch 42 for calibrating the output of the inclination sensor 40 and a limit switch 44 for a fail safe. The outputs of the sensors 36 and the like are sent to the control unit 26 in the body.

Figure 2:
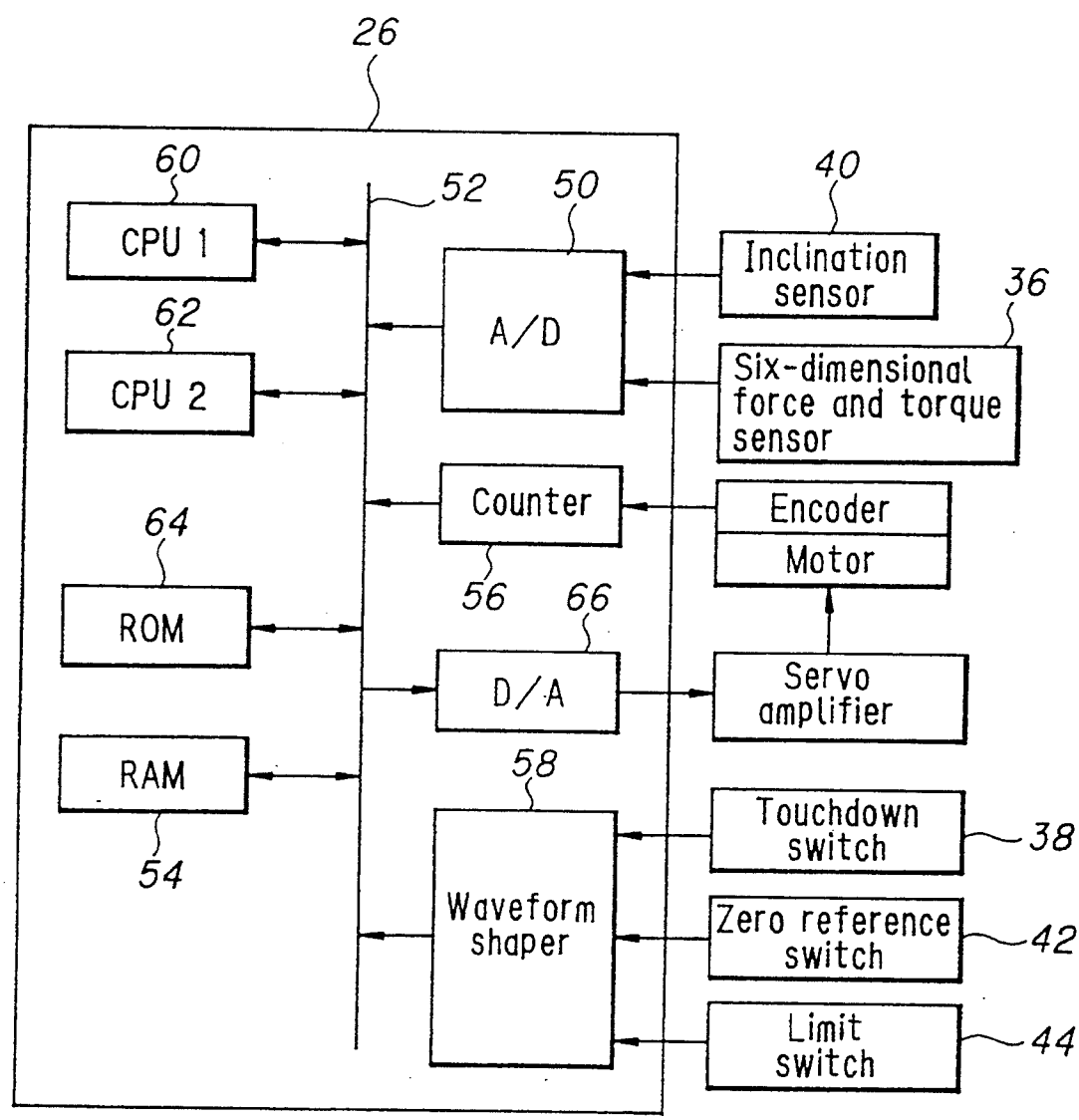
FIG. 2 is a block diagram showing the details of a control unit illustrated in FIG. 1.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 and the like are stored in the RAM 54 via a waveform shaper 58. The control unit has a first processor 60, a second processor 62 and a ROM 64. The first processor 60 computes target joint angles on the basis of the gait determined in a manner explained later and outputs the same to the RAM 54. The second processor 62 fetches the target joints angles and measured joint angles from the RAM 54, computes control commands of the individual joint motors and sends the same to associated servo amplifiers thereof via a D/A converter 66.

The operation of the system according to the invention will now be explained primarily with reference to gait (walking pattern) generation.

The operation of the system is shown in the form of a flow chart in FIG. 3. The explanation will focus on the generation of a gait for the case where the robot is at the boundary between two ground surfaces (planes) meeting at a dihedral angle of $\theta$ as shown in FIG. 4 and the robot's two feet are simultaneously resting on different ones of the two planes. The part of the ground surface with which the bottom of the left foot (bottom surface of the foot 22L; referred to as the "first foot bottom") is in contact will be designated the "first ground contact region" and the ground surface with which the bottom of the right foot (bottom surface of the foot 22R; referred to as the "second foot bottom") is in contact will be designated the "second ground contact region". The term "ground contact region" is defined as the region of contact between the robot and the ground. The planes including the first and second ground contact regions are called the "first ground plane" and the "second ground plane." The term "ground plane" is used in the sense of a mathematical plane of infinite size, i.e. it is not restricted to the limits of the actual ground. Further, it should be noted that, although the word "plane" is used here, the word is used to includes a surface which are not entirely flat throughout its entire length or width. In the other words, the word "plane" is not limited to such "a surface such that a straight line that joins any two of its points lies entirely in that surface" as is defined in mathematics and may includes a surface having a small bump or depression.

The flow chart of FIG. 3 starts with step S10 in which an absolute coordinate system (designated as "E0" in FIG. 4 as will be explained), a first coordinate system ("E1") and a second coordinate system ("E2") are established. The z axis of the absolute coordinate system extends vertically upward. The first coordinate system is a relative system whose x-y plane is the first ground plane, and the second coordinate system is a relative system whose x-y plane is the second ground plane. As shown in FIG. 4, in the interest of simplicity, the origin of the first coordinate system is located directly under the intersection point of the ankle joints 18, 20L and that of the second coordinate system is located directly under the intersection point of the ankle joints 18, 20R. The x axes thereof are aligned with the direction of robot advance and the z axes thereof are oriented in the same direction as vectors normal to the first and second ground planes. (The direction of the normal vectors is that from within the ground toward the ground surface.) The direction of each axis of the coordinate systems is indicated by a rotation matrix $E_i$ (i indicating a numeral such as E1 indicates the first coordinate system whereas 0 for the absolute coordinate system; hereinafter the same). The ground contact pressure distribution occurring at the ith ground contact region is called the ith ground contact pressure distribution and the ith ground contact pressure distribution as seen from the ith ground contact region is described as fi→(p→) as shown in Eq.1 and FIG. 5.

fi→(p→): ith ground contact pressure distribution as seen form ith ground contact region $$(fix{\to}(p{\to}),\ fiy{\to}(p{\to}),\ fiz{\to}(p{\to}))^T \qquad \text{Eq. 1}$$

The force acting on the robot 1 from the ith ground contact region and the moment produced thereby are called the ith ground reaction force and expressed as Eq.2;

ith ground reaction force as seen from the ith ground contact region : (Ei, Ui→, Zi→, Fi→, Mi→)$^T$ where Zi→: the center of ith ground contact pressure distribution as seen from the ith coordinate system (also called as the point of action of the ith ground reaction force)

$$(Zix,\ Ziy,\ Ziz)^T$$

Zix: the x coordinate of the center of the ith ground contact pressure distribution fiz→(p→) as seen from the ith ground contact region Ziy: the y coordinate of the center of the ith ground contact pressure distribution fiz→(p→) as seen from the ith ground contact region Ziz: 0

Fi→: force component of ith ground reaction force as seen from the ith coordinate system $$(Fix,\ Fiy,\ Fiz)^T$$

Mi→: moment component of the ith ground reaction force as seen from the ith coordinate system $$(Mix,\ Miy,\ Miz)^T$$

Provided that Mix=0 and Miy=0     Eq. 2

Figure 6:
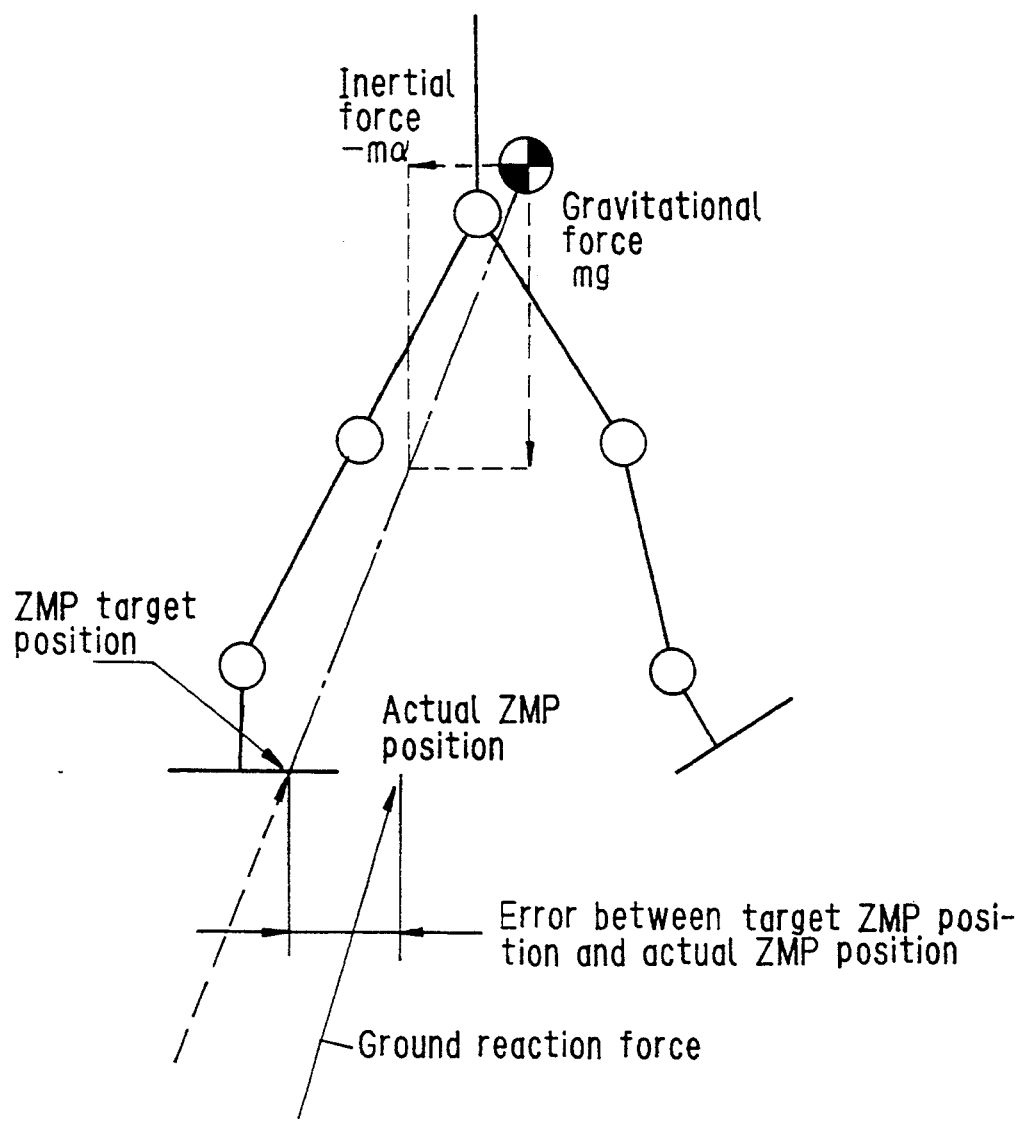
FIG. 6 is a view explaining forces acting on the robot of FIG. 1.

As shown in FIG. 5, the center of the ground contact pressure distribution is a point of action of the ground reaction force at which, aside from the moment Mz about the z axis, no moment Mx or ,My is produced about the x or y axes. (In the sense this is partially equal to the concept of ZMP as will be mentioned later.) The resultant force and resultant moment of all ground reaction forces produced at the ground contact region are called the overall ground reaction force. As shown in FIG. 6, the ground reaction force is the reaction force produced against the resultant of the gravitational force mg and the inertial force -mα acting on the robot. The robot walks stably when these forces acting on it are in dynamic equilibrium.

Control next passes to step S12 in which the time at the end of the one-leg support period during which the robot is supported on the first foot bottom is defined as ts, the time of shifting to the one-leg support period during which the robot is supported on the second foot bottom (after passing through a two-leg support period) is defined as te, and the center of the first foot bottom's ground contact pressure distribution at time ts and the center of the second foot bottom's ground contact pressure distribution at time te are calculated. Next, the trajectory of a "virtual ZMP" (proposed by the inventors and will be explained later) is defined by connecting the two centers as indicated by the broken line in FIG. 4. As shown in FIG. 4, in the case where, at the beginning of a two-leg support period, the foot of the leg that has up till then been the supporting leg is in flat contact with the ground, if the center of the first foot bottom's ground contact pressure distribution is positioned near the center of the foot and is then moved toward the toe (forward end of foot 22L) near the end of the flat-footed support period, it becomes possible to generate a gait with high stability. When there is no flat-footed support period during the two-leg support period, it suffices to fix the center of the first foot bottom's ground contact pressure distribution at the toe during the two-leg support period. The center of the second foot bottom's ground contact pressure distribution is set near the heel (rearward end of the foot 22R). Since no ground reaction force is produced at the second foot bottom at time ts, the position of the ZMP and the center of the first foot bottom's ground contact pressure distribution coincide. Similarly, the position of the ZMP and the center of the second foot bottom's ground contact pressure distribution coincide at time te.

Here, let's designate the center of the first foot bottom's ground contact pressure distribution as seen from the first coordinate system as Z1→ and the center of the second foot bottom's ground contact pressure distribution as seen from the second coordinate system as Z2→. Then the center of the first foot bottom's ground contact pressure distribution as seen from the absolute coordinate system can be written as U1→+E1Z1→ and the center of the second foot bottom's ground contact pressure distribution as seen from the absolute coordinate system can be written as U2→+E2Z2→. (Ui is the translation vector and, as mentioned earlier, Ei is the rotation matrix.) The translation vector Ui→ and the rotation matrix Ei are defined as Eq. 3;

Ui→: Coordinates of origin of ith coordinate system as seen from absolute coordinate system $$(Uix,\ Uiy,\ Uiz)^T$$

Ei: Matrix whose rows are standard vectors of ith coordinate system as seen from absolute coordinate system First row of Ei (ei11, ei12, ei13)

Second row of Ei (ei21, ei22, ei23)

Third row of Ei (ei31, ei32, ei33)     Eq.

Control then passes to step S14 in which a 11th coordinate system is established. The origin of the 11th coordinate system is positioned at the center of the first foot bottom's ground contact pressure distribution. In other words, it is arranged such that U11→=Ui→+E1Z1→. The direction of the z axis of the 11th coordinate system is aligned with that of the z axis of the first coordinate system. The direction of the y axis of the 11th coordinate system is aligned with the outer product of the normal vector of the second ground plane and the normal vector of the first ground plane. In other words, it is aligned with the line of intersection between the first and second ground planes.

Control then passes to step S16 in which a 21st coordinate system is established. The origin of the 21st coordinate system is positioned at the center of the second foot bottom's ground contact pressure distribution. In other words, it is arranged such that U21→=U2→+E2Z2→. The direction of the z axis of the 21st coordinate system is aligned with that of the z axis of the second coordinate system. The direction of the y axis of the 21st coordinate system is aligned with the outer product of the normal vector of the second ground plane and the normal vector of the first ground plane. As shown in FIG. 4, this direction is the same as that of the y axis of the 11th coordinate system.

Control then passes to step S18 in which a third plane (a virtual ground plane) is assumed and designated as a 31st ground plane. The third plane is displaced with the passage of time. A 31st coordinate system whose x-y plane includes the 31st ground plane is also assumed. The origin of the 31st coordinate system is positioned at the point of the aforesaid virtual ZMP that is desired to be established on the virtual ground plane. Since, as explained earlier, the y axes of the 11th and the 21st coordinate systems are aligned with each other, the y axis of the 31st coordinate system is aligned with these.

Figure 7:
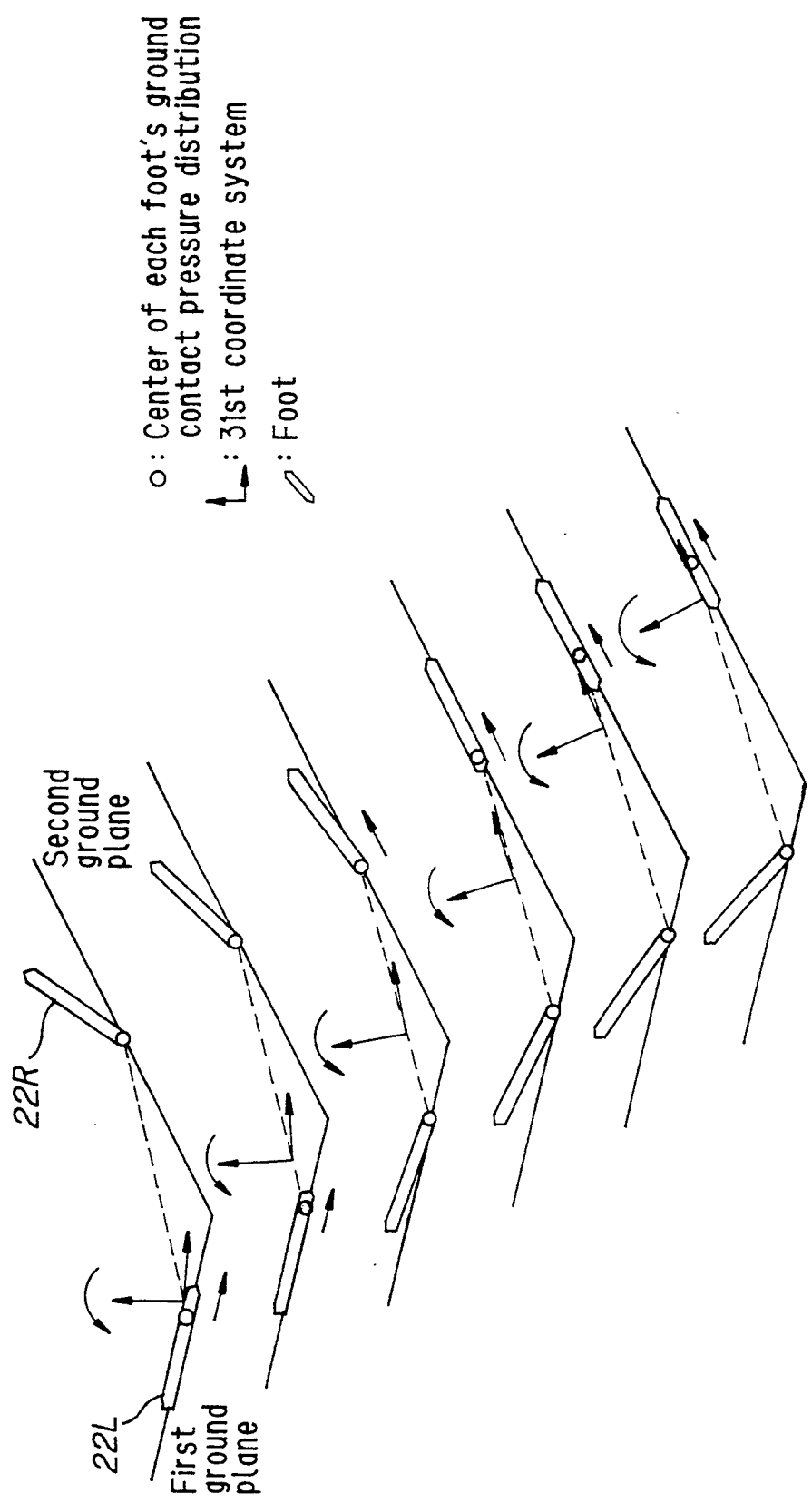
FIG. 7 is a view explaining the gait generation according to the flow chart of FIG. 3 in which a virtual ground surface (plane) on which a virtual target ZMP (Zero Moment Point) can be determined is displaced between the two surfaces (planes)

Then as illustrated in FIG. 7, the position at which it is desired to establish the virtual ZMP, namely the 31st coordinate system's origin position $U31\rightarrow$ is gradually displaced from the center of the first foot bottom's ground contact pressure distribution ($U11\rightarrow$) to the center of the second foot bottom's ground contact pressure distribution ($U21\rightarrow$) between time ts and time te and the rotation transformation matrix E31 between the absolute coordinate system and the 31st coordinate system is gradually changed form E11 to E21. Specifically, as shown in FIG. 7, U31 is gradually moved from $U11\rightarrow$ to $U21\rightarrow$ along a line segment (indicated by dashed lines in the figure) whose extremities are $U11\rightarrow$ and $U21\rightarrow$. Here, by establishing a function h whose value is zero at time ts and is 1 at time te, $U31\rightarrow$ can be expressed as Eq. 4;

$$U31\rightarrow = h\ ((U21\rightarrow + E21Z2\rightarrow) - (U11\rightarrow + E11Z1\rightarrow)) + (U11\rightarrow + E11Z1\rightarrow) \quad \text{Eq. 4}$$

As a simple example of the function h, there can be given by Eq. 5:

$$h=(t-ts)/(te-ts) \quad \text{Eq. 5}$$

Control then passes to step S20 in which robot's trajectories are generated so as to make the ZMP position on the virtual ground plane kinematically calculated from the motion of the robot 1 coincident with the origin of the 31st coordinate system. The ZMP on the virtual ground plane referred to here is defined as the point of action at which the components of the total moment other than the component in the vertical direction of the ground surface become zero when the resultant force and resultant moment of the ground reaction forces acting on the foot bottoms in kinematic equilibrium with the resultant force and resultant moment of the inertial force and gravitational force acting on the robot are transformed to a resultant force and a resultant moment acting at a single point on the virtual ground plane.

Since the joints of the robot 1 have 12 degrees of freedom, if the position and orientation of the hip (point midway between the two hip joints) and the position and orientation of the foot 22L (R) of the free leg are determined with respect to the foot 22R (L) of the supporting leg, the angles of all twelve joints can be determined. For continuously varying even the acceleration of the joint angles it suffices to make the position and orientation of the robot's hip and the position and orientation of the foot of its free leg change continuously even in terms of acceleration. However, since it is impossible to directly design a hip position which causes the ZMP calculated kinematically to coincide with the designed ZMP, the hip trajectory is designed in the following manner.

Figure 8:
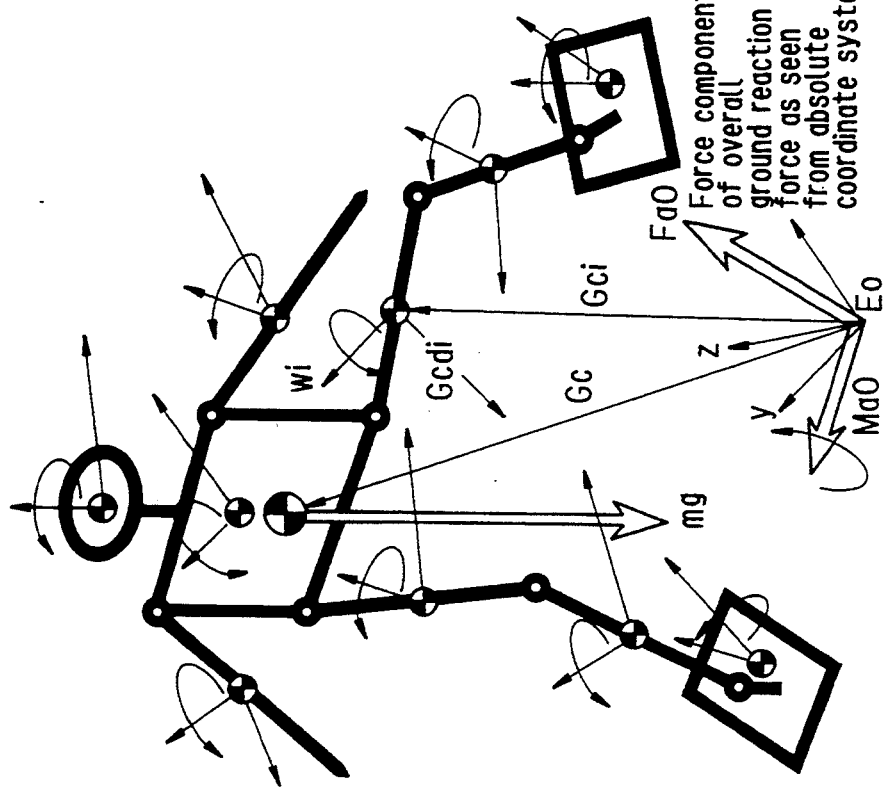
FIG. 8 is a view explaining physical quantities used for the gait generation according to the flow chart of FIG. 3.

The relationship between the ZMP and the robot's momentum is defined by Equations 6 to 9 based on the Newton and Euler equations and the conversion equation for the point of action of force. The physical quantities used are defined in FIG. 8.

$$FaO + mg = mGcdd \quad \text{(Newton equation)} \quad \text{Eq. 6}$$

$$MaO + Gc\times(mg) = Lwd + Lvd \quad \text{(Euler equation)} \quad \text{Eq. 7}$$

$$FaO = E31Fa31 \quad \text{(force coordinate transformation equation)} \quad \text{Eq. 8}$$

$$MaO = E31Ma31 + (U31 + E31Z31)\times E31Fa31 \quad \text{(point of action-moment relationship and coordinate conversion equation)} \quad \text{Eq. 9}$$

The forgoing equations give Eq. 10;

$$E31Ma31 = Lwd + Lvd - Gc\times(mg) - (U31 + E31Z31)\times(mGcdd - mg) \quad \text{Eq. 10}$$

Since Z31 is equal to the ZMP, Eq. 11 will be given.

$$Ma31x = Ma31y = 0 \quad \text{Eq. 11}$$

Since Equations 10 and 11 leave one degree of freedom of the hip position movement undefined, a single constraint condition relating to the hip position such as shown in Eq. 12 is added:

$$f(Hipx, Hipy, Hipz,..) = 0 \quad \text{Eq. 12}$$

By selecting a hip trajectory that satisfies Eqs. 10, 11 and 12, it becomes possible to generate a hip trajectory wherein the actual ZMP is at the target position. As is clear from the form of Eq. 10, the acceleration of the center of gravity and the ZMP are included as multiplication terms in the same equation. Therefore, the displacement of the ZMP is continuous, and if the change in the direction angle of the normal direction of the virtual ground plane is continuous, even the acceleration of the hip trajectory will be continuous. A prerequisite at this time, however, is that the position-/orientation of the foot and the orientation of the hip be continuous. The gait is determined in the foregoing manner.

Control then passes to step S22 in which the target angles of the 12 joints are calculated on the basis of the so-determined gait and to step S24 in which the servo control values are calculated with consideration to attitude stabilization. As both of these steps are well known to the art, they will not be explained further here.

Figure 9:
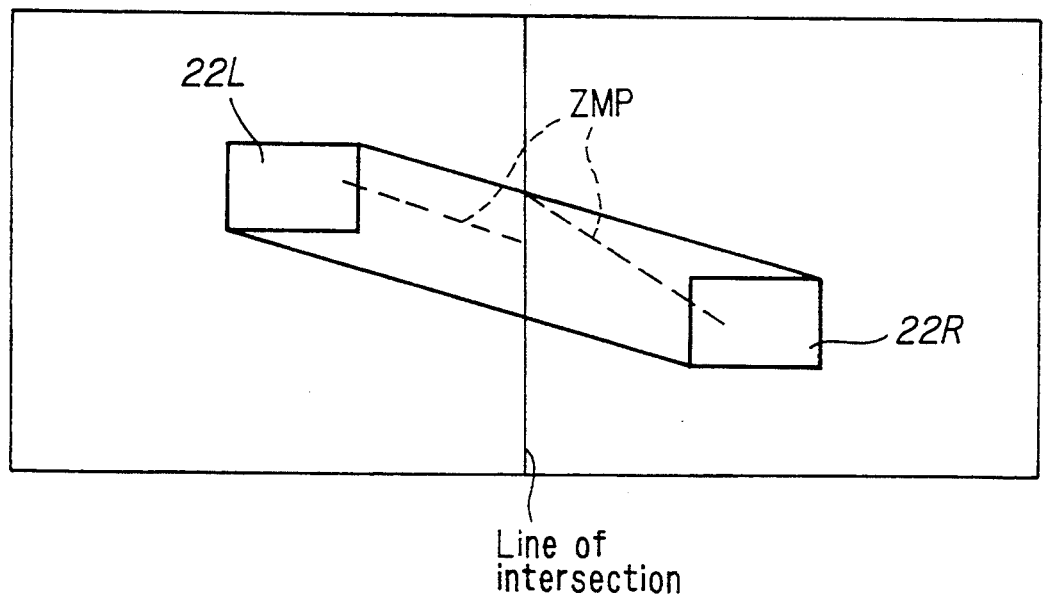
FIG. 9 is a development elevation viewed from the above showing the two feet in contact with the two surfaces (planes) and a ZMP trajectory determined on the basis of the prior art ZMP concept.
Figure 10:
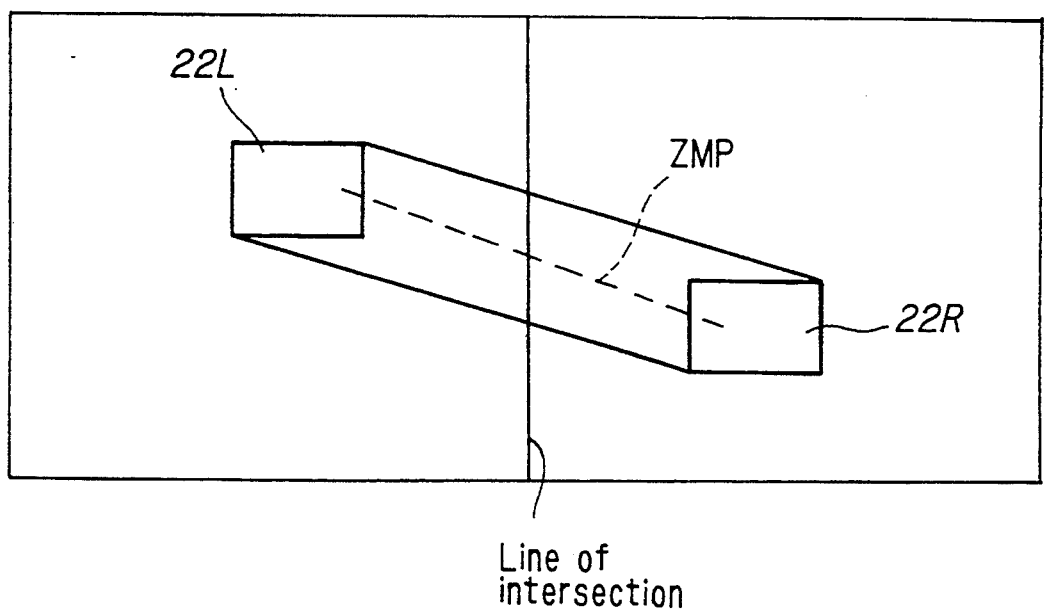
FIG. 10 is a view, similar to FIG. 9, but showing a ZMP trajectory determined on the basis of the invented ZMP concept.

Being configured in the foregoing manner, the embodiment is able to generate a gait with a high margin of stability even on uneven terrain and in other situations where ground contact is made with two or more planes simultaneously. This will be explained with reference to FIGS. 9 and 10, FIG. 9 is a development elevation viewed from above showing the two feet in contact with two planes which, like those shown in FIG. 4, intersect at a dihedral angle of $\theta$. It shows an example of how the ZMP is positioned using the prior art ZMP concept. FIG. 10 is a similar development elevation showing an example of how the ZMP is positioned using the expanded ZMP concept of this invention.

(Precisely speaking, the ZMP is positioned on the virtual ground plane in this invented concept.) When the ZMP is positioned using the prior art ZMP concept as in FIG. 9, the ZMP trajectory lacks continuity because the planes are different on opposite sides of the intersection line. This can be analyzed as follows. The ZMP can be expressed by the force F and the moment component Mz about the vertical axis, but the latter of these, i. e., the moment component Mz is inherently decided by the gait and cannot be manipulated. With the prior art ZMP concept, therefore, the ZMP becomes discontinuous and jumps where the plane changes. Since the magnitude of the jump cannot be ascertained in advance, moreover, it is impossible to know with certainty whether the ZMP is located inside or outside the minimum convex polygon. Even it should fall outside, the attitude would still be well maintained if the foot bottom friction were infinite. In fact, however, the foot bottom friction is generally limited and, therefore, the robot is liable to lose its balance and fall.

In the embodiment, on the other hand, since a virtual ZMP trajectory is established with respect to a virtual ground plane, it becomes possible, as shown in FIG. 10, to maintain the ZMP near the center of the minimum convex polygon at all times, even at the transition between planes. Moreover, the generated trajectories, particularly the hip trajectory, can be made continuous even as regards acceleration, and, as shown in FIGS. 4 and 7, the virtual ZMP trajectory is also made continuous. As a result, smooth robot motion can be achieved, the bottoms of the robot's feet tend to comply better with the terrain, and the servo motors can be more easily controlled to follow the target values.

Moreover, when the expanded ZMP concept proposed here is employed, during the one-leg support period the ground contact region of the bottom of the supporting foot can be made to fall within the virtual ground plane and the designed trajectory of the center of the ground contact pressure distribution of the supporting foot bottom (which is the same as the ZMP trajectory during the one-leg support period) can be made to coincide With the virtual ZMP, whereby a one-leg support period walking pattern similar to that of the prior art can be generated.

Figure 11:
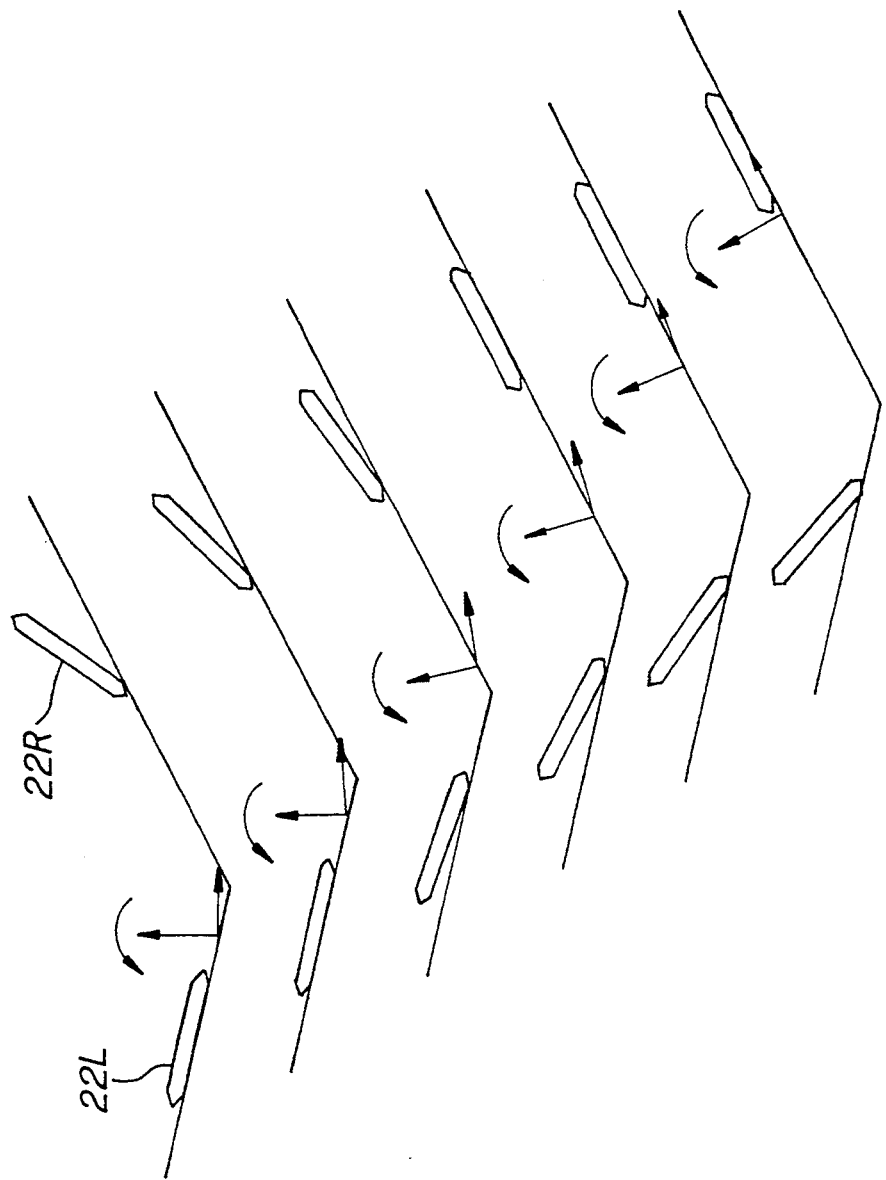
FIG. 11 is a view, similar to FIG. 7, but showing a gait generation according to a second embodiment of the invention.

FIG. 11 shows a second embodiment of the invention. This is an explanatory view similar to FIG. 7 showing the transition of the center of the ground contact pressure distribution and the 31st coordinate system. In this embodiment, the 31st coordinate system is established on the actual ground planes (the first and second ground planes).

Differently from what was explained in the foregoing, the direction of the y axes of the 11th and 21st coordinate systems need not necessarily be aligned with the outer product of the normal vector of the second ground plane and the normal vector of the first ground plane. If it is not, however, the simple method of the first embodiment cannot be used to preset the direction of the virtual ground plane and it becomes necessary to use, for example, a method in which the orientation of the virtual ground plane is expressed using an Euler angle and the Euler angle is gradually varied.

Although it was explained that the displacement of the origin position U31 of the 31st coordinate system is conducted by the proportional distribution, it is also possible to use any of various other methods. Defining function h by sequential expression can be considered even more preferable because it enables real time response to gait modifications.

The invention is not limited to the earlier embodiment of defining the direction of the z axis of the 31st coordinate system. It is alternatively possible to gradually vary the angular ratio between the angle between the direction of the z axis of the 31st coordinate system and the direction of the z axis of the 11th coordinate system and the angle between direction of the z axis of the 21st coordinate system and the direction of the z axis of the 11th coordinate system such that it becomes 0 at time ts and 1 at time te.

In addition, the z axis direction vector of the 31st coordinate system can be set in the direction of the resultant vector defined as Eq. 13;

$$\text{Resultant vector} = z \text{ axis direction vector of 11th coordinate system} \times (1-k) + z \text{ axis vector of 21st coordinate system} \times k \qquad 13$$

where
k is a function having a value of 0 at time ts and a value of 1 at time te While the embodiments were described with reference to the case where the planes met at a dihedral angle, the invention can also be applied to a case in which two planes were in parallel with each other such as stairs' surface.

While embodiments Were given in which the ZMP trajectory was continuous, the invention is also effective to some degree even if the ZMP trajectory is discontinuous.

Moreover, the invention does not require that the origin of the 31st coordinate system be fixed on the trajectory as in the foregoing embodiments but also allows it to move appropriately.

Nor is the invention limited to the generation of a hip trajectory. It is can also be applied for the generation of robot's center of gravity trajectory. On the other hand, when generation of a hip trajectory is conducted using convergence computation, it is possible to use an approximate calculation in which the number of convergence computations is limited.

Further, although the invention was explained such that it could be applied to a case in which a gait such as the hip trajectory was preestablished in advance, it may alternatively be applied to a case in which a gait is determined real time during walking.

Furthermore, while the invention was described with reference to a biped walking robot as an example of a legged mobile robot, the invention can be applied to other legged mobile robot having three legs or more.

Moreover, the present invention has thus been shown and described with reference to the specific embodiments. However, it should be noted that the invention is in no way limited to the details of the described arrangements, changes and modifications may be made without departing from the scope of the appended claims.

What is claimed is:

1. A system for generating a gait of a legged mobile robot with a plurality of legs in walking on a terrain including at least a first surface and a second surface such that the robot legs are in simultaneous contact with the first and second surfaces, comprising:
    first means for assuming a virtual third surface which varies between the first and second surfaces;
    second means for assuming target ZMP (Zero Moment Point) on the virtual third surface; and third means for generating a gait of the robot such that a ZMP kinematically determined from the motion of the robot coincides with the target ZMP.

2. A system according to claim 1, wherein said first means assumes the virtual third surface which continuously varies between the first and second surfaces.

3. A system for generating a gait of a biped mobile robot in walking on a terrain including at least a first surface and a second surface such that the robot legs are in simultaneous contact with the first and second surfaces, comprising:

first means for assuming a virtual third surface which varies from the first surface to the second surface during a period starting at a time when one robot leg lands on the second surface while keeping another robot leg on the first surface and ending at a next time when the another robot leg takes off the first surface;

second means for assuming a target ZMP (Zero Moment Point) on the virtual third surface; and third means for generating a gait of the robot such that a ZMP kinematically determined from the motion of the robot coincides with the target ZMP.

4. A system according to claim 3, wherein said first means assumes the virtual third surface which continuously varies from the first surface to the second surface during the period.

5. A system for generating a gait of a biped mobile robot in walking on a terrain including at least a first surface and a second surface such that the robot legs are in simultaneous contact with the first and second surfaces, comprising:

first means for determining centers of ground contact pressure distribution of the first and second surfaces during a period starting at a time when one robot leg lands on the second surface while keeping another robot leg on the first surface and ending at a next time when the another robot leg takes off the first surface;

second means for assuming a virtual third surface which continuously varies from the first surface to the second surface;

third means for assuming a target ZMP (Zero Moment Point) on the virtual third surface such that the target ZMP is on a line obtained by connecting the centers of the ground contact pressure distribution of the first and second surfaces at every moment; and fourth means for generating a gait of the robot such that a ZMP kinematically determined from the motion of the robot coincides with the target ZMP at every moment.

6. A system according to claim 5, further including:

fifth means for establishing a first coordinate system whose origin is at the center of the ground contact pressure distribution of the first surface, a second coordinate system whose origin is at the center of the ground contact pressure distribution of the second surface, and a third coordinate system whose origin is at the target ZMP, and said fourth means generates the gait such that the ZMP kinematically determined from the motion of the robot coincides with the origin of the third coordinate system at every moment.

7. A system according to claim 5, wherein said third means assumes the target ZMP such that the its trajectory is continuous.

8. A system according to claim 5, wherein said third means assumes the target ZMP suck that its trajectory is at continuous velocity.

9. A system according to claim 5, wherein said third means assumes the target ZMP such that its trajectory is at continuous acceleration.

10. A system according to claim 5, wherein said third means assumes the target ZMP to be the point obtained by dividing the line proportionally to the rest of the period.

11. A system according to claim 5, wherein the biped mobile robot has a body and the two legs each connected to the body, and said fourth means generates the gait by establishing at least a trajectory of the portion at which the body and the two legs are connected.

12. A system according to claim 5, wherein the biped mobile robot has a body and the two legs each connected to the body and each having a foot at its distal end, and said fourth means generates the gait by establishing at least trajectories of the portion at which the body and the two legs are connected and the foot.

13. A system according to claim 6, wherein said fifth means establishes the first to third coordinate systems such that y axes thereof are made same in orientation.

14. A system according to claim 5, wherein the first and second surfaces meet at a dihedral angle.

* * * * *